(12) United States Patent
Callies et al.

(10) Patent No.: US 7,588,200 B2
(45) Date of Patent: Sep. 15, 2009

(54) DISTRIBUTION TUBE ASSEMBLY FOR IRRIGATION

(75) Inventors: Robert E. Callies, Leigh, NE (US); Charles H. Meis, Albion, NE (US)

(73) Assignee: Lindsay Manufacturing Company, Lindsay, NE (US)

( * ) Notice: Subject to any disclaimer, the term of this patent is extended or adjusted under 35 U.S.C. 154(b) by 1280 days.

(21) Appl. No.: 09/872,604

(22) Filed: Jun. 1, 2001

(65) Prior Publication Data

US 2002/0179738 A1    Dec. 5, 2002

(51) Int. Cl.
   *B05B 15/00* (2006.01)
(52) U.S. Cl. ...................................... 239/450
(58) Field of Classification Search ................. 239/450, 239/542, 547, 533.1, 533.13; 138/110, 108, 138/120
See application file for complete search history.

(56) References Cited

U.S. PATENT DOCUMENTS

| | | | | |
|---|---|---|---|---|
| 3,866,833 A | * | 2/1975 | Shibata et al. | 239/76 |
| 4,162,041 A | * | 7/1979 | Hane | 239/266 |
| 4,173,309 A | * | 11/1979 | Drori | 239/592 |
| 4,763,842 A | * | 8/1988 | Dunn | 239/542 |
| 4,824,019 A | * | 4/1989 | Lew | 239/201 |
| 4,915,351 A | * | 4/1990 | Hoffman | 251/149.1 |
| 4,934,745 A | * | 6/1990 | Healy | 285/255 |
| 5,275,447 A | * | 1/1994 | McNab | 285/148.23 |
| 6,003,559 A | * | 12/1999 | Baker | 138/108 |

* cited by examiner

*Primary Examiner*—Davis Hwu
(74) *Attorney, Agent, or Firm*—Cook Alex Ltd.

(57) ABSTRACT

A distribution tube assembly for an irrigation system having a main supply line for conveying fluid therein includes a first end, a second end and an internal surface defining at least two fluid passageways, at least one of the fluid passageways being in fluid communication with the main supply line. The other fluid passageway may be in fluid communication with an alternate supply line. Adaptors and regulators may be attached to the distribution tube assembly. The distribution tube assembly permits irrigation to be performed by multiple fluid streams, allows for the incorporation of chemicals within the distribution tube assembly, and provides for selectable flow control.

25 Claims, 5 Drawing Sheets

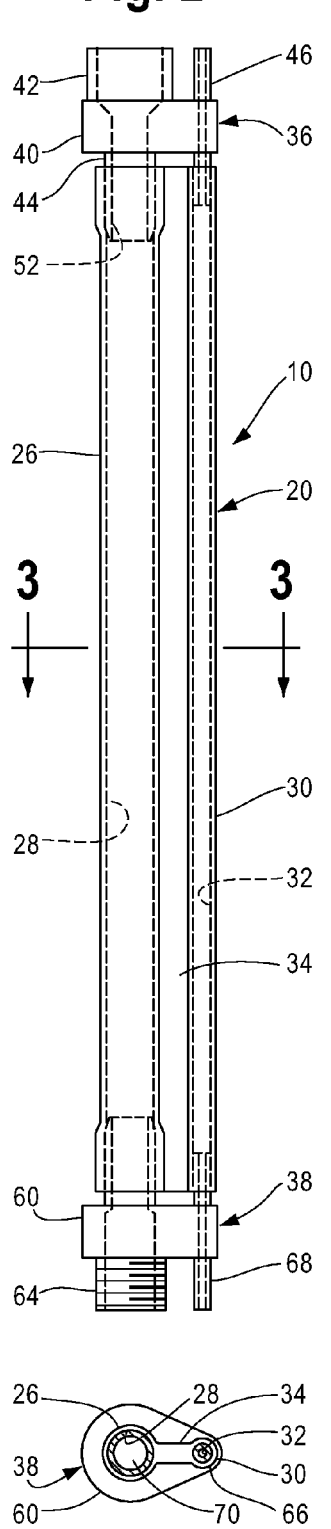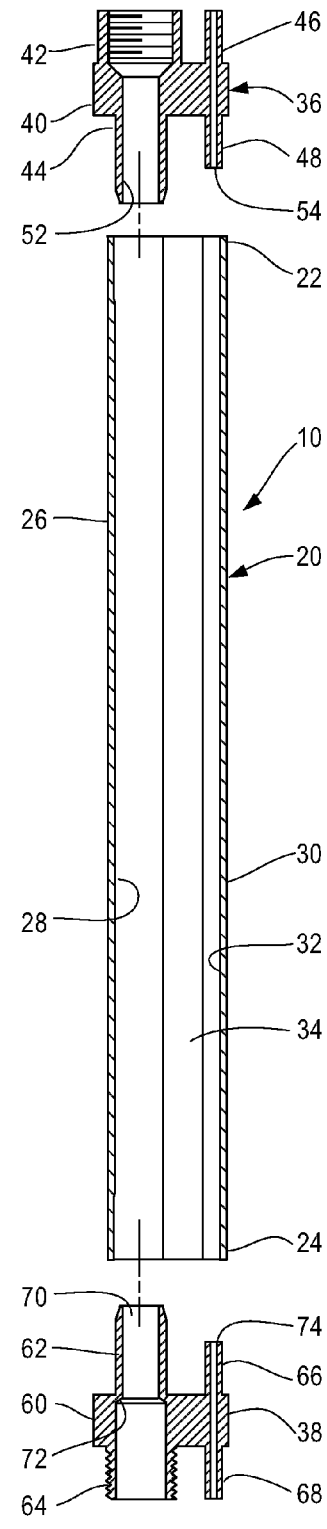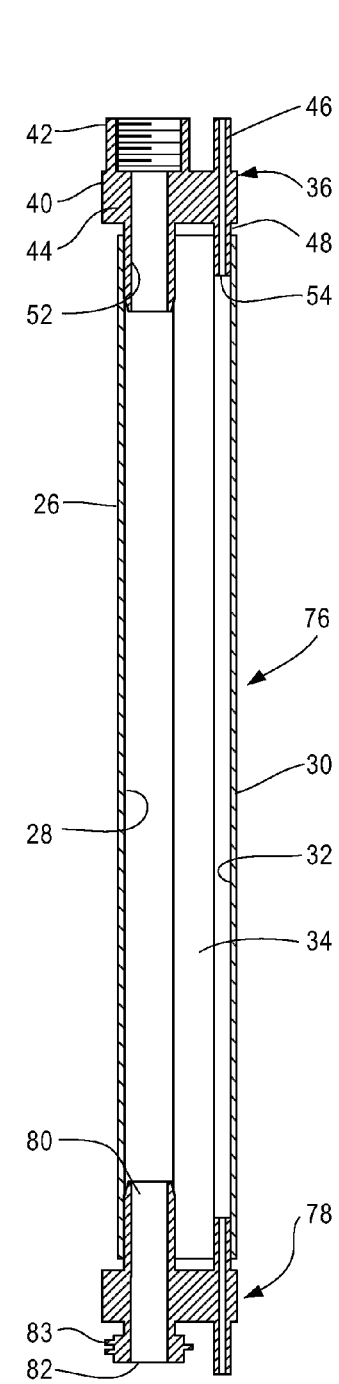

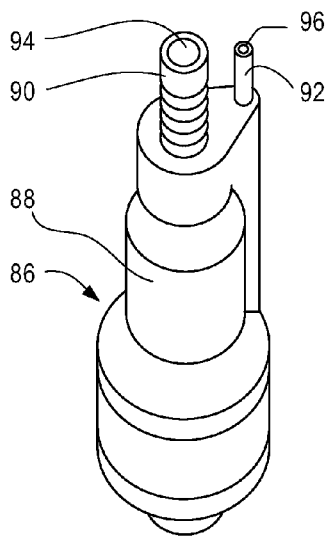
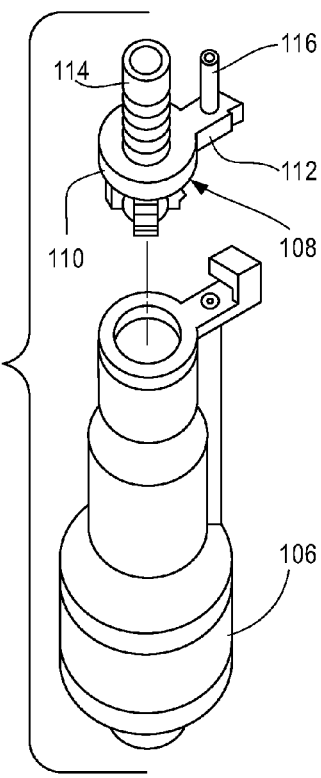
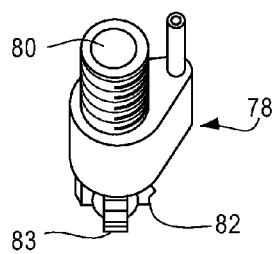
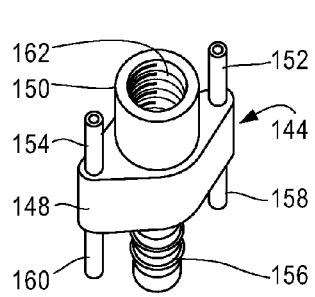
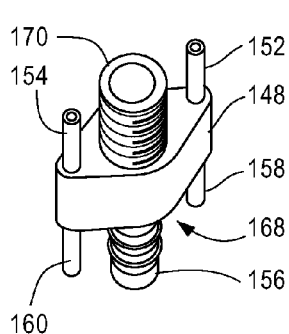
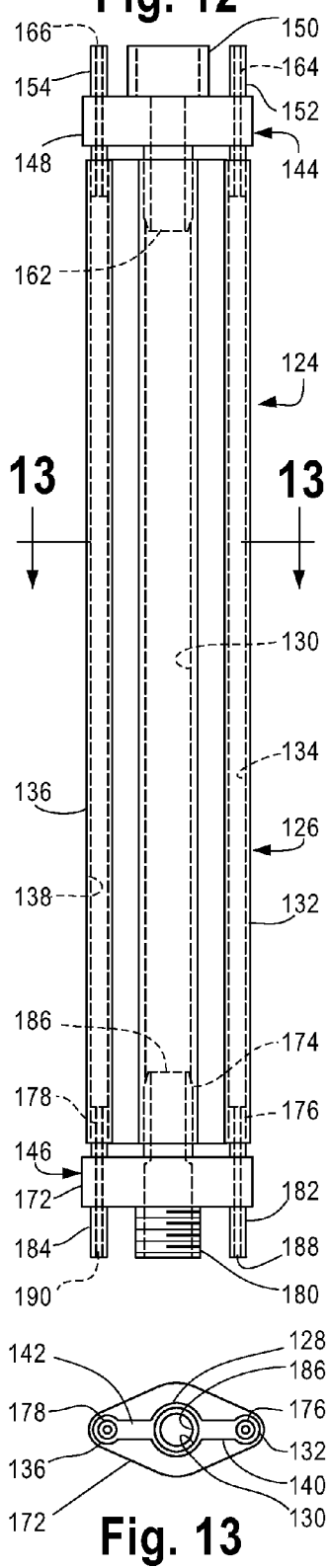

DISTRIBUTION TUBE ASSEMBLY FOR IRRIGATION

BACKGROUND OF THE INVENTION

The present invention relates to irrigation systems of either the movable or fixed type. Conventional irrigation systems have a main supply line. In movable irrigation machines the supply line is commonly supported at intervals by wheels or mobile towers. Conventional movable or fixed irrigation systems have a main supply line which may be supported at some height above the earth, placed on the surface of the earth or buried within the earth. At various points along the supply line, a distribution tube extends from the main supply line to a pressure regulator and a nozzle or other suitable discharge devices. The distribution tube may extend upwardly, downwardly, laterally, or some combination of these. Conventional pressure regulators are well known in the art and supply a constant pressure to the associated discharge apparatus despite pressure fluctuations in the main supply line due to friction losses or undulating terrain. A typical regulator is shown in U.S. Pat. No. 4,543,985. Many different nozzles or other discharge apparatus are available to provide the desired application.

Current irrigation systems generally allow for the conveyance of a single fluid, usually water or, alternatively, water pre-mixed with chemicals or other additives. The fluid is supplied from a source into the main supply line and from there it flows into the distribution tubes. Conventional distribution tubes have a single fluid passageway for conveying the fluid. They do not provide for separate conveyances of fluid streams such as separate chemical or additive streams. If a mixed fluid stream is required, the chemicals or additives must be added to the water before it enters the main supply line or, alternatively, chemical or additive treatments must occur separately. Thus, there is a need to provide a distribution tube which allows for the incorporation of chemical or additive fluid streams therein.

In addition, current irrigation systems provide for only one fluid flow rate. Although some irrigation systems may allow for selected discharge apparatus to be turned on or off, they only provide for one rate of flow while the discharge apparatus is operating. There is no way to obtain an intermediate flow rate in instances where reduced flow rates are desired such as where the particular kind of crop has a low tolerance for overwatering. Thus, there is a need to provide a selectable flow control to each discharge apparatus thereby allowing for more than one rate of flow.

The present invention provides a distribution tube assembly which allows for multiple media streams. It further allows for selectable flow control, chemical application and the incorporation of additives into the irrigation water stream. It might further be utilized to carry granular media for distribution.

SUMMARY OF THE INVENTION

The irrigation distribution tube assembly of the present invention provides for a distribution tube assembly which is in fluid communication with a main supply carrying a fluid. The distribution tube assembly includes a distribution tube frame which has at least two passageways located therein. The distribution tube frame may be made from a material such as aluminum, polyethylene or PVC and may be made by means of an extrusion-die process which allows for the passageways to be immediately adjacent one another. Alternatively, the distribution tube frame may be constructed from separate tubes, each of which has at least one passageway. Where separate tubes are used, they may be secured together by straps located along the lengths thereof and may have differing sizes, shapes and lengths. Where a single distribution tube frame with several passageways is used, any number, shape and size of passageways are possible although distribution tube frames with two and three passageways will be shown in the drawings. The passageways may have the same or different diameters to allow for multiple flow rates through the distribution tube assembly. The flow within each passageway may be selectively controlled by suitable control means which may be actuated by electrical or electronic command, radio signals, GPS, pneumatics, or the like. Multiple flow rates may also be achieved by selectively controlling two or more passageways to operate simultaneously.

At least one passageway receives fluid from the main supply. The remaining passageway or passageways may receive media from the main supply or from an alternate supply line. The alternate supply line may preferably be mounted on or otherwise connected to the main supply. A plurality of fittings spaced along the alternate supply line provide fluid communication between the alternate supply line and the appropriate passageways in the distribution tube frames. The alternate supply line may be fed from a reservoir containing suitable chemicals or additives, such as fertilizers, insecticides, fungicides or herbicides. The alternate supply line may carry granular media for distribution. The alternate supply line may also carry a pilot pressure fluid for operating control valves. Where chemicals, additives or other media are desired as part of the emitted fluid stream, mixing with the main fluid stream may occur at a downstream end of the distribution tube assembly, or in a mixing chamber, a pressure regulator or discharge apparatus. Or the chemicals may be dispensed separately from the main fluid flow, without mixing of the two or more streams.

The distribution tube assembly may further include adaptors which have bores through them which are in fluid communication with the distribution tube passageways. The adaptor may be attached to the main supply line or a fitting thereof or to intervening hardware such as a hose, gooseneck, valve, regulator or nipple. At least one of the adaptor bores may be in fluid communication with the main supply line. Where chemicals or additives are used, one or more bores may be in fluid communication with an alternate supply line. The adaptors are attached to the distribution tube frame in a press fit, interference fit, by clamping means, or the like or molded as an integral part of the unit. A pressure regulator, mixing chamber, and/or apparatus may be attached to the tube assembly. Alternatively, the adaptor may have a cavity for receiving a pressure regulator or other apparatus therein.

BRIEF DESCRIPTION OF THE DRAWINGS

FIG. 2 is a side elevation view of the distribution tube assembly of the present invention.

FIG. 3 is a section taken along line 3-3 of FIG. 2.

FIG. 4 is an exploded axial section of the assembly of FIG. 2.

FIG. 5 is a section similar to FIG. 4 but not exploded and with an alternate adaptor.

FIG. 9 is a perspective view of an adaptor having a cavity for receiving a regulator valve.

FIG. 10 is a perspective view of the adaptor shown in FIG. 5.

FIG. 11 is a perspective view of a similar adaptor and a regulator valve.

FIG. 12 is a side elevation view of a further alternate embodiment of a distribution tube assembly.

FIG. 13 is a section taken along line 13-13 of FIG. 12.

FIG. 14 is a perspective view of an adaptor with three passageways for use with the distribution tube frame of FIG. 13.

FIG. 15 is a perspective view of an alternate adaptor having three passageways.

DETAILED DESCRIPTION OF THE INVENTION

Figure 1:
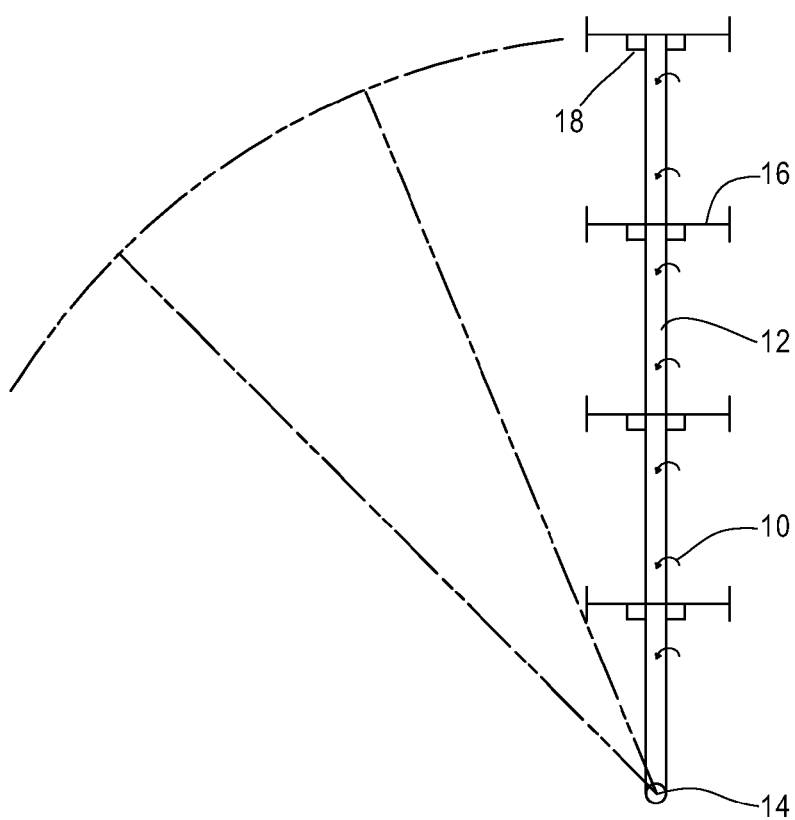
FIG. 1 is a diagrammatic plan view of a center pivot irrigation machine.

The distribution tube assembly 10 of the present invention is used in conjunction with an irrigation system. The irrigation system may consist of a fixed position system utilized for the production or protection of fruits, vegetables, vine crops etc. or it may be a temporary or movable system which can be relocated to serve multiple uses. The irrigation may be a typical center pivot irrigation machine such as the type found in U.S. Pat. Nos. 3,785,400, 3,983,898, 3,994,514, 4,127,181, 4,240,582, or 5,695,129, all assigned to Lindsay Manufacturing Company. The irrigation system may be of the type which is laterally movable such as that shown in U.S. Pat. No. 4,330,085, also assigned to Lindsay Manufacturing Company. It is further contemplated that the invention can be used in any other type of irrigation system which utilizes either rotational or linear movement or a combination thereof, or which consists of a fixed position system or it may be a temporary or movable system which can be relocated. Therefore, by way of example and not limitation, the distribution tube assembly is shown in FIG. 1 as being attached to a conventional center pivot irrigation machine having a main supply line 12 which extends outwardly from the center pivot 14 and is supported at space intervals by mobile towers 16, each of which is self propelled by a motor drive 18. A plurality of gooseneck tubes are illustrated schematically in FIG. 1. They extend out the top of the supply line 12 and then curve downwardly toward the ground.

A distribution tube assembly according to the present invention is shown generally at 10 in FIGS. 2-4. It will be understood that the distribution tube assembly 10 may be connected to the main supply line 12 and be in fluid communication therewith. The assemblies 10 may be connected to the gooseneck tubes or they could be connected directly to the supply line. Any suitable connection is acceptable. Any number of distribution tube assemblies can be located at spaced intervals along the main supply line. The distribution tube assembly 10 includes a distribution tube frame 20 having a first end 22 and a second end 24 (FIG. 4). The distribution tube frame 20 in this embodiment comprises a first conduit 26 which defines a first passageway 28 and a second conduit 30 which defines a second passageway 32. The conduits 26 and 30 are joined by a web 34. This form of distribution tube frame may be advantageously fabricated as a die-formed extrusion of suitable material such as aluminum, polyethylene or PVC. As can be seen in FIG. 3 the web 34 and conduits 26, 30 are integrally formed such that the end faces of the web form a portion of the conduits.

Although two passageways are shown with the first passageway 28 having at least twice the diameter of second passageway 32, three or more fluid passageways of any size are possible. The first and second passageways 28, 32 are generally longitudinally directed along the distribution tube frame 20. At least one of the first and second passageways 28, 32 may be in fluid communication with the main supply line 12, which may be connected to a water source. The other of the first and second passageways 28, 32 may be in fluid communication with an alternate supply line, which may be a pipe or hose attached to the main structure. The alternate supply line may be connected to a reservoir containing chemicals, additives, pilot pressure fluid or the like. It will be understood that means are provided to pressurize or otherwise convey the media in both the main supply line and the alternate supply line.

The distribution tube frame may alternately be formed by at least two separate distribution tubes where each of the distribution tubes has one flow passageway therein. In this way, the individual distribution tubes may be of different diameter, length or shape to accommodate variable assembly requirements. The distribution tubes may be attached to each other at any point along their lengths. It is also possible that the distribution tubes could have first ends which are fluidly separate and a second end which combines two or more of the individual distribution tubes to provide a mixed stream.

Figure 7:
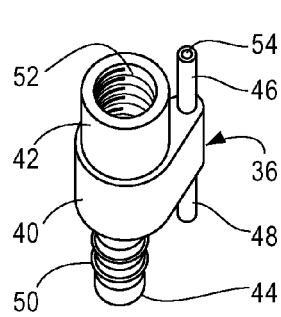
FIG. 7 is a perspective view of an adaptor with two passageways.

The distribution tube assembly 10 may further include a first adaptor 36 and a second adaptor 38. As shown in FIGS. 2 and 7, the first adaptor 36 has a body member 40 with first and second couplers 42 and 44 and first and second stems 46 and 48 projecting from the body member 40. The first coupler 42 has internal threads for securing it to a threaded male fitting (not shown) on the main supply line. The second coupler 44 fits into the passageway 28 of the distribution tube frame 20 while the second stem 48 similarly fits in passageway 32. The second coupler 44 and second stem 48 may engage the passageway walls by a press fit or interference fit, gluing, clamping or the like. Or the second coupler and second stem may have a ribbed or barbed surface which contacts the distribution tube frame walls. The second coupler 44 is shown in FIG. 7 with external ribs 50 to assist in retaining the coupler in the distribution tube. A first bore 52 extends through the body member 40 and the two couplers 42, 44 to provide fluid communication from the main supply line through the adaptor 36 to the first passageway 28. A second bore 54 extends through the body member 40 and the two stems 46, 48 to provide fluid communication from either the main supply line or an alternate supply line through the adaptor 36 to the second passageway 32.

Figure 8:
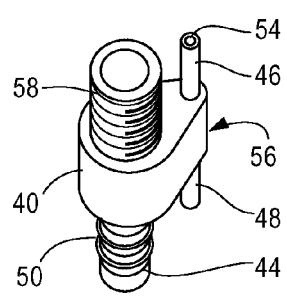
FIG. 8 is a perspective view of an alternate adaptor with two passageways.
Figure 16:
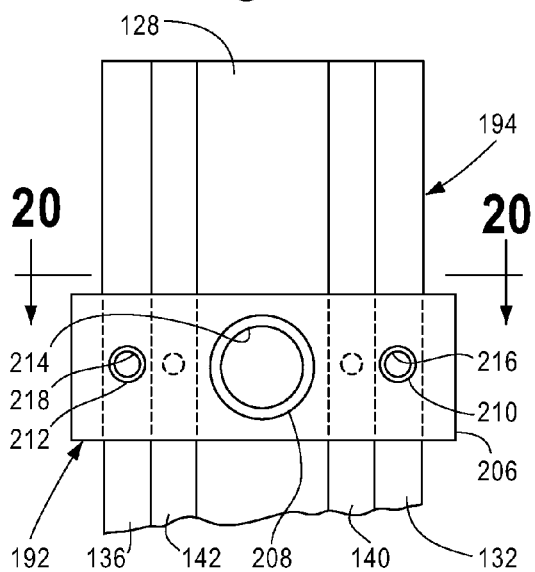
FIG. 16 is a front elevation view of a further alternate distribution tube assembly which includes a branch fitting.

FIG. 8 shows an alternate first adaptor 56, which is similar to the first adaptor 36, with like parts shown with like numbers, except that the first adaptor 56 has a first coupler 58 with external threads thereon.

Multiple passageways may be fluidly connected either to the main supply line or to alternate supply lines to provide for selectable flow control. Each of the fluid streams could be controlled between on and off positions using valves controlled by GPS, radio or electrical signals or the like, thus allowing for different flow rates through the distribution tube assembly.

Looking now at the second adaptor 38 in FIG. 4, it has a body member 60 with first and second couplers 62 and 64 and first and second stems 66 and 68 projecting from the body member 60. The second coupler 64 has external threads which might be utilized for securing it to a conventional pressure regulator or discharge apparatus (not shown). The first coupler 62 fits into the passageway 28 of the distribution tube frame while the first stem 66 similarly fits in passageway 32. The first coupler 62 and first stem 66 may engage the passageway walls in a press fit or they may have a ribbed or barbed surface which contacts the distribution tube walls. A first bore 70 extends through the body member 60 and the two couplers 62, 64 to provide fluid communication from the passageway 28 through the adaptor 38 to the discharge apparatus or other fitting. Midway through the first bore 70 its diameter changes at an annular step 72. A second bore 74 extends through the body member 60 and the two stems 66, 68 to provide fluid communication from the passageway 32 through the adaptor 38 to the discharge apparatus or other fitting.

During operation of the distribution tube assembly 10 at least one of the first and second passageways 28, 32 receives fluid from the main supply line 12 or the alternate supply line. The distribution tube assembly allows for a selectable flow control where fluid will flow either through the first passageway 28 or the second passageway 32 or both. This could be achieved by placing valves at the first or second ends of the distribution tube. Selectable flow control also provides for fluid streams of different flow rates where the passageways having the same or different shapes, diameters or lengths may operate alternatively or simultaneously. The present invention further allows for chemical application and the incorporation of additives into the irrigation water stream where one of the first and second passageways 28, 32 may be fluidly connected to an alternate supply line containing chemicals, additives or the like. The chemicals or additives may be mixed together within the distribution tube assembly or they may exit the distribution tube assembly as separate streams. The alternate supply line may alternately convey pilot pressure fluid for operating hydraulically controlled valves. The alternate supply line may alternately carry granular media for distribution.

FIGS. 5 and 10 show an alternate embodiment of a distribution tube assembly 76. This is similar to that shown in FIGS. 2-4, with like parts shown with like numbers, except that a second adaptor 78 has a first bore 80 with a uniform diameter. Other bore configurations for any of the above-described adaptors are possible including a bore which narrows in the direction of fluid flow. The second adaptor 78 has a second coupler 82 but lacks a second stem. The second coupler has a part-turn connector 83 engageable with a nozzle or a flexible hose or other apparatus.

Figure 6:
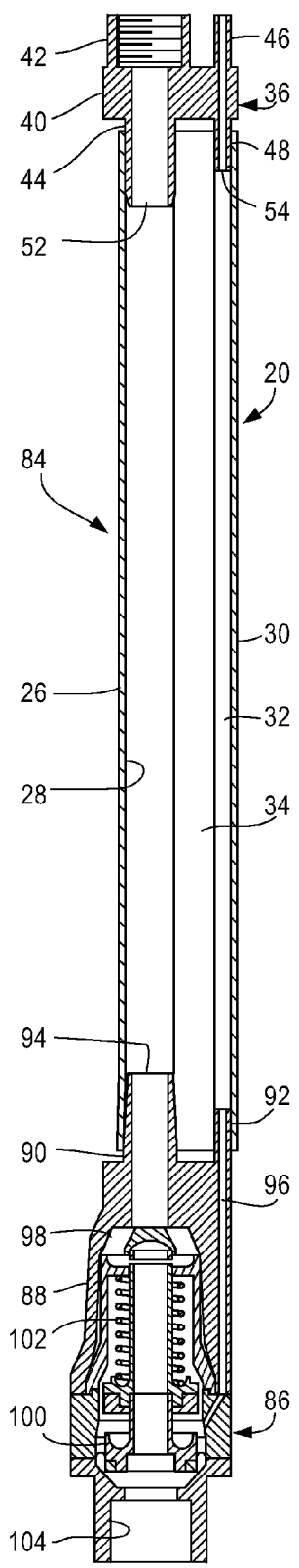
FIG. 6 is a section through the distribution tube assembly showing a further alternate adaptor having a regulator valve incorporated therein.

In FIGS. 6 and 9 a further alternate embodiment of a distribution tube assembly is shown generally at 84. The distribution tube frame 20 is similar to the distribution tube frame in FIGS. 2-4, with like parts having common reference numbers. Assembly 84 replaces the second adaptor with a regulator valve 86. The regulator valve is of the type shown and described U.S. Pat. No. 6,374,853, which is assigned to the present assignee. The disclosure of this patent is incorporated herein by reference. Regulator valve 86 has a body member 88 from which an upstream coupler 90 and a stem 92 extend. A first bore 94 is formed in the coupler 90 and the body 88. A second bore 96 extends through stem 92 and body 88. The upstream coupler 90 fits into into first passageway 28 such that first bore 94 is in fluid communication with passageway 28. Stem 92 fits in the second passageway 32 so second bore 96 is in fluid communication with passageway 32. The first bore 94 joins a cavity 98 which receives the working components of the regulator valve such as a spool 100 and a spring 102. Details of the regulator valve are provided in the above-referenced application. The regulator valve receives water from the first bore 94 and receives pilot pressure fluid from the second bore 96. A solenoid valve or other suitable means (not shown) may be connected to the secondary passageway 32. If pilot pressure fluid is supplied to the regulator valve 86 the valve will shut off flow through the first bore 94. If no pilot pressure fluid is supplied to the regulator valve it then permits water at regulated pressure to exit at the regulator outlet 104. The regulator outlet 104 may have internally or externally located threads, a barb or other like attachments to secure a hose, nozzle, or other suitable apparatus.

FIG. 11 shows the combination of a regulator valve 106 and adaptor 108. This is similar to the structure shown in FIG. 6 except that it is made from a two-piece construction. The regulator valve 106 is similar to that shown in the above-referenced application. The adaptor has a body portion 110, a connector plate 112, a coupler 114 and a stem 116. The coupler and stem join the second end of the distribution tube frame to transfer the water flow and pilot pressure fluid to the regulator valve. The regulator valve and adaptor may be attachable in any type of engagement including but not limited to a snap fit, press or interference fit, barbed fit, integral molding or threadable engagement.

Turning to FIGS. 12-15, an alternate embodiment of a distribution tube assembly is shown at 124. Distribution tube frame 126 has a first conduit 128 defining a first passageway 130, a second conduit 132 defining a second passageway 134, a third conduit 136 defining a third passageway 138, and first and second webs 140, 142 joining the three conduits. The distribution tube assembly further includes a first adaptor 144 and a second adaptor 146. Although the first passageway 130 is shown as being substantially centrally located within the distribution tube frame 126 and being at least twice as large as the second and third passageways 134, 138, any combination of orientation, shape and/or diameter for the passageways is possible. As described above, alternate constructions are contemplated where the distribution tube assembly may be constructed as separate conduits, each of which has a single passageway. For example, three conduits could be attached together to achieve a similar result as hereinafter described.

The first adaptor 144 has a body member 148 with a first coupler 150 and two first stems 152, 154 projecting upwardly from the body. The first coupler 150 may have internal threads as shown. A second coupler 156 and second stems 158, 160 project downwardly from the body 148 (FIG. 14). The second coupler may have external ribs. A central bore 162 extends through the body 148 and the first and second couplers 150 and 156. Similarly, bores 164, 166 extend through the body 148 and stem pairs 152, 158 and 154, 160. The first coupler 150 joins an externally-threaded nipple or like fitting (not shown) on the main supply line. The first stems 152, 154 each join one of the main supply line, an alternate supply line or a third supply line. The second coupler 156 and second stems 158, 160 fit into the passageways 130, 134 and 138 of the distribution tube frame 126 as shown. In FIG. 15, an alternate first adaptor 168 which is similar to the first adaptor 144 with like parts shown with like numbers except that the first adaptor 168 has a first coupler 170 with external threads located thereon for attachment to the main supply line, or additional fittings which are in fluid connection with the main supply line.

The second adaptor 146 has a body member 172 with a first coupler 174 and two first stems 176, 178 projecting upwardly from the body. The first coupler may have external ribs. A second coupler 180 and second stems 182, 184 project downwardly from the body. The second coupler may have external threads as shown. A central bore 186 extends through the body 172 and the first and second couplers 174 and 180. Similarly, bores 188, 190 extend through the body 172 and stem pairs 176, 182 and 178, 184. The first coupler 174 joins the central distribution tube passageway 130. The first stems 176, 178 join the passageways 134 and 138, respectively. The second coupler 180 and second stems 182, 184 may connect to a pressure regulator, a nozzle, a regulator valve or some combination of these or other suitable elements.

Figure 17:
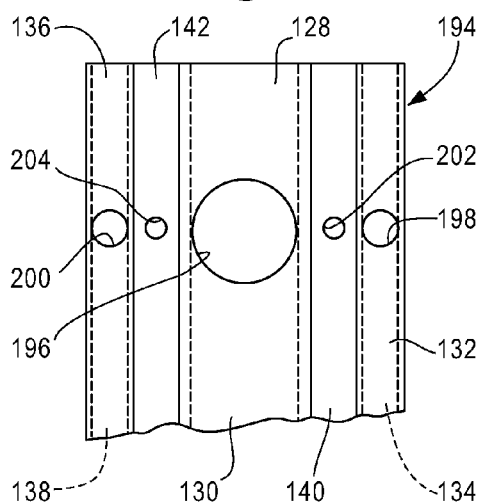
FIG. 17 is a view similar to FIG. 16 with the branch fitting removed to show the various openings in the frame.
Figure 18:
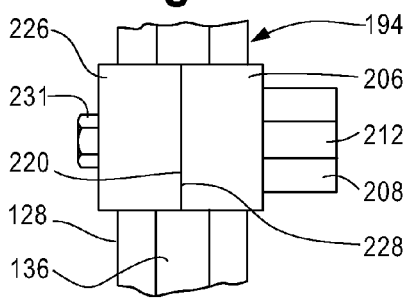
FIG. 18 is a side elevation view of the branch fitting.
Figure 19:
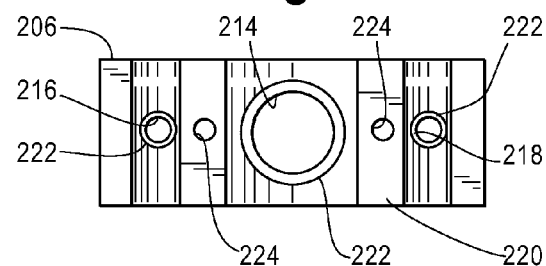
FIG. 19 is a elevation view of the interior surface of the branch fitting.
Figure 20:
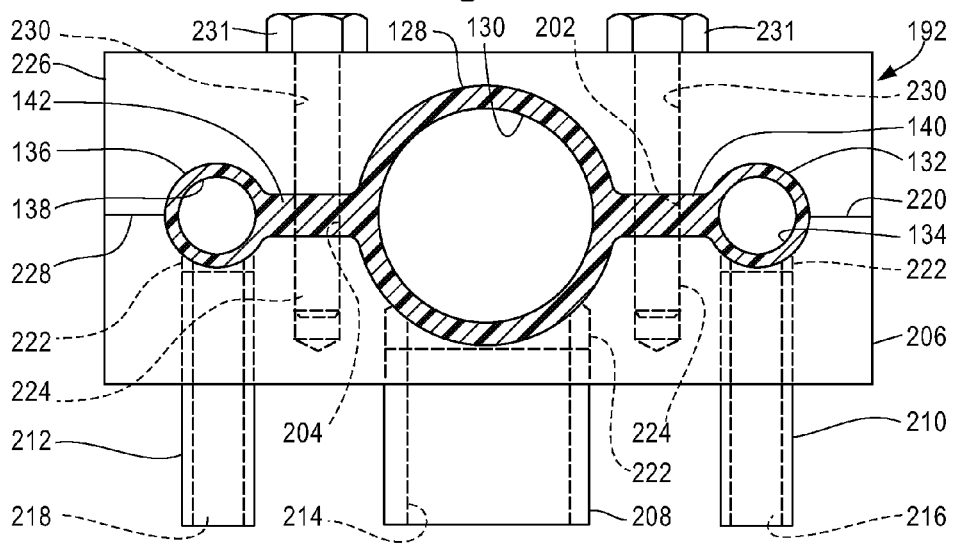
FIG. 20 is a section taken along line 20-20 of FIG. 16.

FIGS. 16-20 show an alternate distribution tube assembly which includes an adaptor in the form of a branch fitting 192. The branch fitting might be utilized to join adjacent distribution tube assemblies or to otherwise communicate with one or more of the passageways in the frame. The branch fitting 192 is used with a distribution tube frame 194 similar to that of FIG. 12 in that it has a first conduit 128 defining a first passageway 130, a second conduit 132 defining a second passageway 134, a third conduit 136 defining a third passageway 138, and first and second webs 140, 142 joining the three conduits. As seen in FIG. 17, the frame 194 differs from frame 126 in that frame 194 furthers includes ports 196, 198 and 200 in the conduits 128, 132 and 136, respectively. The ports provide communication with the passageways 130, 134 and 138. Frame 194 also has apertures 202, 204 through the webs 140, 142.

The branch fitting 192 comprises two or more parts which may be utilized in the following manner. A branch block 206 has a first coupler 208 and two stems 210, 212 projecting outwardly from the body of the block. A central bore 214 extends through the branch block 206 and the first coupler 208. Similarly, bores 216, 218 extend through the body 206 and the stems 210 and 212. An opposing surface 220 of the branch block 206 is formed to generally conform to the profile of one side of the distribution tube frame 194. Seals 222 are provided on surface 220 surrounding each bore 214, 216 and 218. See FIGS. 19 and 20. The opposing surface 220 also has two threaded sockets 224 formed therein. The sockets may not extend all the way through the branch block 206.

The branch fitting may also include a retainer block 226 which has one face 228 that is shaped to conform generally to the profile of one side of the distribution tube frame. The retainer block has holes 230 extending all the way through the block. Bolts 231 may be placed through the holes 230 and the web apertures 202, 204 for insertion into the threaded sockets 224 in the branch block 206 to hold the blocks on the frame. Retainer block 226 may alternatively be formed as an integral part of branch block 206, with suitable means for retention. In a further alternate arrangement, instead of using one branch block and one retainer block as shown, two branch blocks 206 could be assembled back to back on the frame 194. In application, one or more of the bores 214, 216 or 218 may join and communicate with one or more of the main supply line, an alternate supply line or a third supply line, or they may join in the form of a branch fitting to intersect one or more distribution tube assemblies and communicate with one or more of the passageways 130, 134 and 138 of a distribution tube frame 194.

Selectable flow control is provided when the three passageways operate individually or concomitantly to produce multiple fluid streams or streams of different flow rates. One or all of the passageways may be operated at the same time to achieve different flow rates. The flow from each passageway may be selectively controlled to allow the flow to be emitted from certain passageways, but not others.

While a preferred form of the invention has been shown and described, it will be realized that alterations and modifications may be made thereto without departing from the scope of the following claims. For example, the distribution tube frame is shown as essentially two (or more) conduits held together, either by an integral web or a series of straps or the like. However, the distribution tube frame could be formed in other configurations. Such alternate configurations might include an elongated block with two or more passages drilled or formed therein. The external shape of the distribution tube frame is not important so long as two or more separate passageways are defined in the frame.

Although each of the couplers is shown as engaging the internal surfaces of the passageways, it is also possible that the couplers may be designed in such a way that they engage the external surfaces of the passageways which are defined by the conduits. In other words, the internal surface of the coupler engages the external surface of the conduit. The stems may also be designed so that they engage the external surface of the conduit. Alternatively, one of the coupler and the stem may engage the external surface and the other may engage the internal surface. The couplers could be in the form of saddle clamps which would have communication through one or more orifices in the sides of the distribution tube frame. The couplers and/or stems may be attached to the passageway in any of the above-described engagements, molded as an integral part of the distribution tube assembly, or by any engagement known to persons skilled in the art.

While the distribution tube assembly is illustrated primarily as a drop tube extending from a gooseneck attached to a mobile supply pipe, it will be understood that a distribution tube assembly could be utilized as a riser (e.g., from a buried supply line in a fixed irrigation system) to support a regulator valve and discharge apparatus assemblies as well as emitters for chemical application. Further, the distribution tube assembly of FIGS. 16-20 need not necessarily be used in conjunction with a main supply line or alternate supply line. That is, the frame 194 might itself be connected to a fluid reservoir with multiple branch fittings providing outlets as needed. Such an arrangement would be most practical in a fixed system with the frame 194 mounted on or above the ground.

What is claimed is:

1. A distribution tube assembly for an irrigation system of the type having a main supply line for conveying fluid, the distribution tube assembly comprising an elongated frame with a first upstream end, a second downstream end and at least two fluid passageways defined therein to permit more than one fluid stream therethrough, each passageway permitting fluid flow from the first upstream end to the second downstream end, at least one of the fluid passageways being in fluid communication with the main supply line, at least another of the fluid passageways being in fluid communication with a second fluid supply line.

2. The distribution tube assembly of claim 1 wherein a first fluid passageway is at least twice as large as a second fluid passageway.

3. The distribution tube assembly of claim 1 wherein a first fluid passageway is in fluid communication with the main supply line and a second fluid passageway is in fluid communication with an alternate supply line.

4. The distribution tube assembly of claim 1 further comprising an adaptor.

5. The distribution tube assembly of claim 4 wherein the adaptor is positioned at the first end of the distribution tube assembly.

6. The distribution tube assembly of claim 4 wherein the adaptor is positioned at the second end of the distribution tube assembly.

7. The distribution tube assembly of claim 4 wherein the adaptor comprises a branch fitting in fluid communication with at least one of the fluid passageways.

8. The distribution tube assembly of claim 4 wherein said adaptor has a plurality of bores disposed therein which are in fluid communication with at least one of the fluid passageways.

9. The distribution tube assembly of claim 4 wherein the adaptor has at least one annular coupler located thereon.

10. The distribution tube assembly of claim 9 wherein the annular coupler engages a selected one of the internal surface of one of the passageways and the external surface of one of the passageways.

11. The distribution tube assembly of claim 10 wherein the annular coupler has external threads for engaging the internal surface of one of the passageways.

12. The distribution tube assembly of claim 10 wherein the annular coupler has external ribs for engaging the internal surface of one of the passageways.

13. The distribution tube assembly of claim 4 wherein the adaptor has a cavity which receives a regulator valve therein.

14. The distribution tube assembly of claim 1 wherein the fluid passageways have different diameters to accommodate different flow rates.

15. The distribution tube assembly of claim 1 further characterized in that there are first, second and third passageways defined in the distribution tube frame.

16. A distribution tube assembly for an irrigation system of the type having a main supply line for conveying fluid, the distribution tube assembly comprising a distribution tube frame having at least two fluid passageways defined therein and extending substantially throughout the frame between an upstream end and a downstream end to direct fluid flow from the upstream end to the downstream end, at least one of the fluid passageways being in fluid communication with the main supply line, at least another of the fluid passageways being in fluid communication with a second fluid supply line.

17. The distribution tube assembly of claim 16 wherein the distribution tube frame has first and second ends and further comprising at least one adaptor attached to the distribution tube frame at one of said first and second ends.

18. The distribution tube assembly of claim 17 wherein said adaptor has at least two bores disposed therein, each bore being in fluid communication with one of the distribution tube fluid passageways.

19. The distribution tube assembly of claim 17 wherein the adaptor has at least one annular projection located thereon, the annular projection engaging a selected one of the internal surface of one of the passageways and the external surface of one of the passageways.

20. The distribution tube assembly of claim 17 wherein the adaptor defines a cavity which receives a regulator valve therein.

21. The distribution tube assembly of claim 16 wherein the distribution tube frame has first and second ends and further comprising a branch fitting attached to the distribution tube frame intermediate the first and second ends.

22. The distribution tube assembly of claim 16 wherein the diameter of one fluid passageway differs from that of the other fluid passageway.

23. The distribution tube assembly of claim 16 wherein the distribution tube assembly has an outlet which provides for a combined fluid stream.

24. The distribution tube assembly of claim 16 wherein the distribution tube frame comprises first and second conduits joined by a web, each conduit defining a passageway therethrough.

25. The distribution tube assembly of claim 16 wherein the distribution tube frame comprises first, second and third conduits joined by first and second webs, each conduit defining a passageway therethrough.

* * * * *